United States Patent
Eisenhauer et al.

(10) Patent No.: US 8,942,139 B2
(45) Date of Patent: Jan. 27, 2015

(54) SUPPORT FOR CONVERGED TRAFFIC OVER ETHERNET LINK AGGREGATION (LAG)

(71) Applicant: International Business Machines Corporation, Armonk, NY (US)

(72) Inventors: Daniel G. Eisenhauer, Austin, TX (US); Vinit Jain, Austin, TX (US); Nilanjan Mukherjee, Santa Clara, CA (US); Badri Ramaswamy, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/707,092

(22) Filed: Dec. 6, 2012

(65) Prior Publication Data

US 2013/0148546 A1   Jun. 13, 2013

Related U.S. Application Data

(60) Provisional application No. 61/568,096, filed on Dec. 7, 2011.

(51) Int. Cl.
*H04L 12/28* (2006.01)
*H04L 12/709* (2013.01)
(Continued)

(52) U.S. Cl.
CPC ........ *H04L 41/0806* (2013.01); *H04L 12/4641* (2013.01); *H04L 45/245* (2013.01); *H04L 49/354* (2013.01); *Y02B 60/33* (2013.01)
USPC ...... 370/255; 370/395.52; 370/397; 370/401; 370/409; 398/58; 709/230; 709/238; 709/249

(58) Field of Classification Search
CPC ............ H04L 67/1097; H04L 12/4625; H04L 12/4633; H04L 12/4641; H04L 49/70; H04L 49/357; H04L 49/201; H04L 49/356; H04L 49/351; H04L 61/2038; H04L 61/6045; H04L 45/245
USPC .................... 370/255, 395.52, 397, 401, 409; 398/58; 709/230, 238, 249

See application file for complete search history.

(56) References Cited

U.S. PATENT DOCUMENTS

| 8,488,601 B1 * | 7/2013 | Wadekar et al. ............... 370/389 |
| 2006/0251067 A1 * | 11/2006 | DeSanti et al. ............... 370/389 |

(Continued)

OTHER PUBLICATIONS

"Configuring an FCoE VLAN Interface;" Technical Documentation; Support; Juniper Networks; Sep. 12, 2011.*

*Primary Examiner* — Alpus H Hsu
*Assistant Examiner* — Elton Williams
(74) *Attorney, Agent, or Firm* — Zilka-Kotab, PC

(57) ABSTRACT

In one embodiment, a system includes a switching processor configured to execute logic, a plurality of ports, at least some of the ports being grouped together in one or more link aggregations (LAGs), logic adapted to create at least a first virtual local area network (VLAN) interface for Ethernet traffic using transmission control protocol/internet protocol (TCP/IP) that is received on at least one of the plurality of ports, and logic adapted to create at least a second VLAN for storage area network (SAN) traffic using Fiber Channel over Ethernet (FCoE) and/or remote direct access memory (RDMA) over Converged Enhanced Ethernet (RoCEE) that is received on at least one of the plurality of ports, wherein no SAN traffic using FCoE and/or RoCEE is assigned to the first VLAN, and wherein no Ethernet traffic using TCP/IP is assigned to the second VLAN.

14 Claims, 7 Drawing Sheets

(51) Int. Cl.
*H04L 12/56* (2006.01)
*H04B 10/20* (2006.01)
*G06F 15/16* (2006.01)
*G06F 15/173* (2006.01)
*H04L 12/24* (2006.01)
*H04L 12/46* (2006.01)
*H04L 12/931* (2013.01)

(56) References Cited

U.S. PATENT DOCUMENTS

| | | | |
|---|---|---|---|
| 2009/0245112 A1* | 10/2009 | Okazaki | 370/236 |
| 2010/0165994 A1* | 7/2010 | Narayanaswamy et al. | 370/395.53 |
| 2011/0064086 A1* | 3/2011 | Xiong et al. | 370/401 |
| 2011/0280572 A1* | 11/2011 | Vobbilisetty et al. | 398/45 |

* cited by examiner

SUPPORT FOR CONVERGED TRAFFIC OVER ETHERNET LINK AGGREGATION (LAG)

RELATED APPLICATIONS

This application claims priority from provisional U.S. Patent Application Ser. No. 61/568,096 filed on Dec. 7, 2011, which is herein incorporated by reference.

BACKGROUND

The present invention relates to data center infrastructure and networking, and more particularly, this invention relates to supporting converged traffic over Ethernet link aggregation (LAG).

Network packet switches use Link Aggregation (LAG) to create a higher bandwidth port channel using multiple switch ports. As defined in the IEEE 802.1AX standard, LAG provides a logical interface to the Media Access Control (MAC) client (higher layer protocol in network stack) and is responsible for distribution of frames across physical ports within a LAG enabled system with the help of a frame distribution algorithm.

LAG may be formed statically or dynamically. Static LAG has a fixed number of ports which are always members of the LAG if they are configured to be members of the LAG. Dynamic LAG, according to Link Aggregation and Control Protocol/LACP IEEE 802.3AD, provides facilities where port members may dynamically join and leave the dynamic LAG. Distributing or load balancing network traffic over the LAG ports is accomplished with algorithms, various different algorithms being currently available to control distribution across members in a LAG. Good algorithms provide efficient ways of hashing packets over the member ports, make sure each port is used equally, and ensure that no one port gets congested.

A switching processor, such as a switching application specific integrated circuit (ASIC) may be used to provide various algorithms which choose ports for network packets. Most of the algorithms are based upon tuples formed from information in the packet header of the packets. The tuples typically include a source media access control (MAC) address, a destination MAC address, a virtual local area network (VLAN) identifier, a source internet protocol (IP) address, a destination IP address, a source transport port, and a destination transport port. Some algorithms consider additional programmable factors to achieve better distribution of packets on ports and/or other usage metrics.

LAGs are important properties of the switches in a network and impact the performance of the switches and network in general. LAGs also alter the overall performance of the set of switches connected together. While link aggregation improves throughput/resiliency performance of a network, higher layer protocols in the end host network stack impose certain constraints on packet delivery. For TCP/IP networks, for example, one requirement may be in-order packet delivery.

A converged Ethernet network may include both Ethernet and storage-based communications for example, where storage communications may include Fiber Channel over Ethernet (FCoE) and/or remote direct access memory (RDMA) over Converged Enhanced Ethernet (RoCEE).

Accordingly, it would be beneficial to be able to utilize LAGs on a converged network in a way that adheres to the requirements of both Ethernet and storage-based protocols.

BRIEF SUMMARY

In one embodiment, a system includes a switching processor configured to execute logic, a plurality of ports, at least some of the ports being grouped together in one or more link aggregations (LAGs), logic adapted to create at least a first virtual local area network (VLAN) interface for Ethernet traffic using transmission control protocol/internet protocol (TCP/IP) that is received on at least one of the plurality of ports, and logic adapted to create at least a second VLAN for storage area network (SAN) traffic using Fiber Channel over Ethernet (FCoE) and/or remote direct access memory (RDMA) over Converged Enhanced Ethernet (RoCEE) that is received on at least one of the plurality of ports, wherein no SAN traffic using FCoE and/or RoCEE is assigned to the first VLAN, and wherein no Ethernet traffic using TCP/IP is assigned to the second VLAN.

In another embodiment, a method for providing LAG to a converged network includes receiving traffic on one or more ports of a plurality of ports, at least some ports being grouped together in a LAG, creating at least a first VLAN interface for Ethernet traffic using TCP/IP that is received on at least one of the plurality of ports, creating at least a second VLAN for SAN traffic using FCoE and/or RoCEE that is received on at least one of the plurality of ports, wherein no SAN traffic using FCoE and/or RoCEE is assigned to the first VLAN, and wherein no Ethernet traffic using TCP/IP is assigned to the second VLAN.

According to another embodiment, a computer program product for providing LAG to a converged network, the computer program product comprising a computer readable storage medium having program code embodied therewith, the program code readable/executable by a computer to: receive network traffic on one or more ports of a plurality of ports, at least some ports being grouped together in a LAG, create at least a first VLAN interface for Ethernet traffic using TCP/IP that is received on at least one of the plurality of ports, and create at least a second VLAN for SAN traffic using FCoE and/or RoCEE that is received on at least one of the plurality of ports, wherein no SAN traffic using FCoE and/or RoCEE is assigned to the first VLAN, and wherein no Ethernet traffic using TCP/IP is assigned to the second VLAN.

Other aspects and embodiments of the present invention will become apparent from the following detailed description, which, when taken in conjunction with the drawings, illustrate by way of example the principles of the invention.

DETAILED DESCRIPTION

Figure 1:
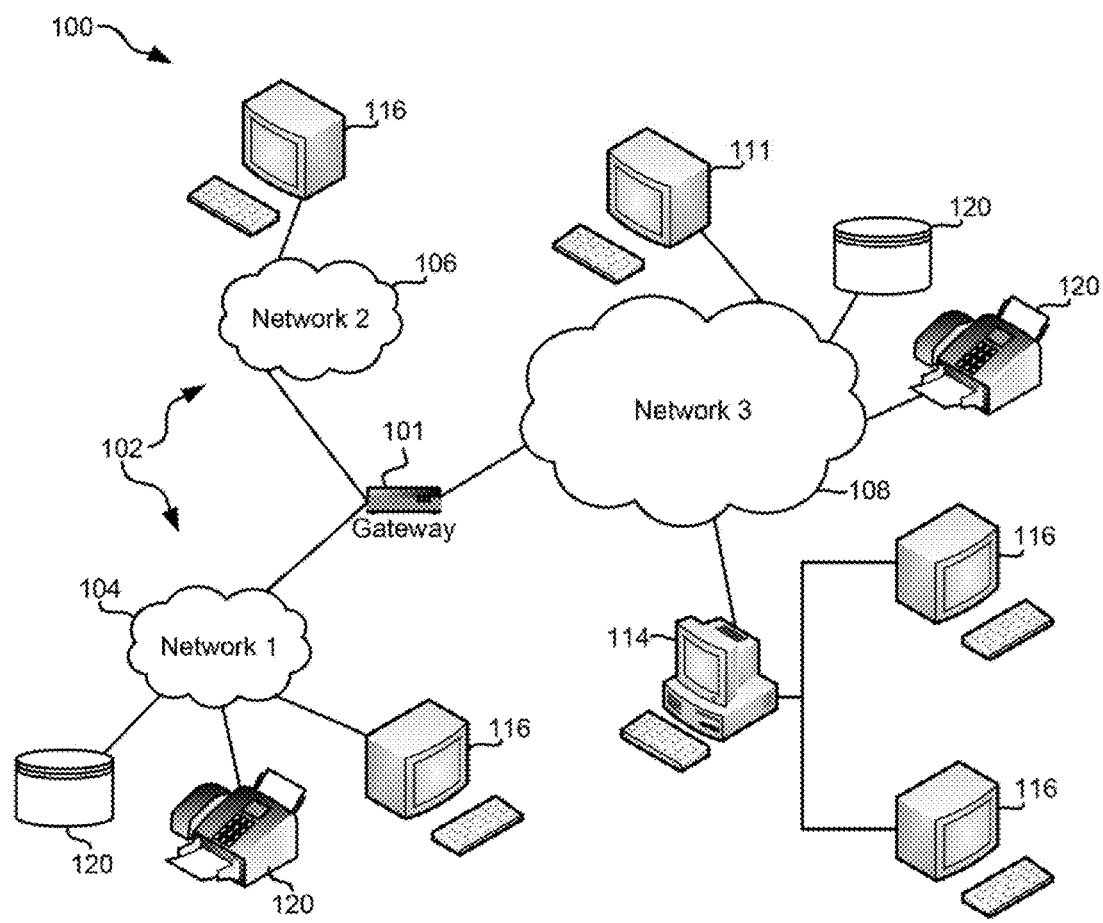
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art author as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one general embodiment, a system includes a switching processor configured to execute logic, a plurality of ports, at least some of the ports being grouped together in one or more link aggregations (LAGs), logic adapted to create at least a first virtual local area network (VLAN) interface for Ethernet traffic using transmission control protocol/internet protocol (TCP/IP) that is received on at least one of the plurality of ports, and logic adapted to create at least a second VLAN for storage area network (SAN) traffic using Fiber Channel over Ethernet (FCoE) and/or remote direct access memory (RDMA) over Converged Enhanced Ethernet (RoCEE) that is received on at least one of the plurality of ports, wherein no SAN traffic using FCoE and/or RoCEE is assigned to the first VLAN, and wherein no Ethernet traffic using TCP/IP is assigned to the second VLAN.

In another general embodiment, a method for providing LAG to a converged network includes receiving traffic on one or more ports of a plurality of ports, at least some ports being grouped together in a LAG, creating at least a first VLAN interface for Ethernet traffic using TCP/IP that is received on at least one of the plurality of ports, creating at least a second VLAN for SAN traffic using FCoE and/or RoCEE that is received on at least one of the plurality of ports, wherein no SAN traffic using FCoE and/or RoCEE is assigned to the first VLAN, and wherein no Ethernet traffic using TCP/IP is assigned to the second VLAN.

According to another general embodiment, a computer program product for providing LAG to a converged network, the computer program product comprising a computer readable storage medium having program code embodied therewith, the program code readable/executable by a computer to: receive network traffic on one or more ports of a plurality of ports, at least some ports being grouped together in a LAG, create at least a first VLAN interface for Ethernet traffic using TCP/IP that is received on at least one of the plurality of ports, and create at least a second VLAN for SAN traffic using FCoE and/or RoCEE that is received on at least one of the plurality of ports, wherein no SAN traffic using FCoE and/or RoCEE is assigned to the first VLAN, and wherein no Ethernet traffic using TCP/IP is assigned to the second VLAN.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be as computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or tray suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing, apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc, may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches: one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
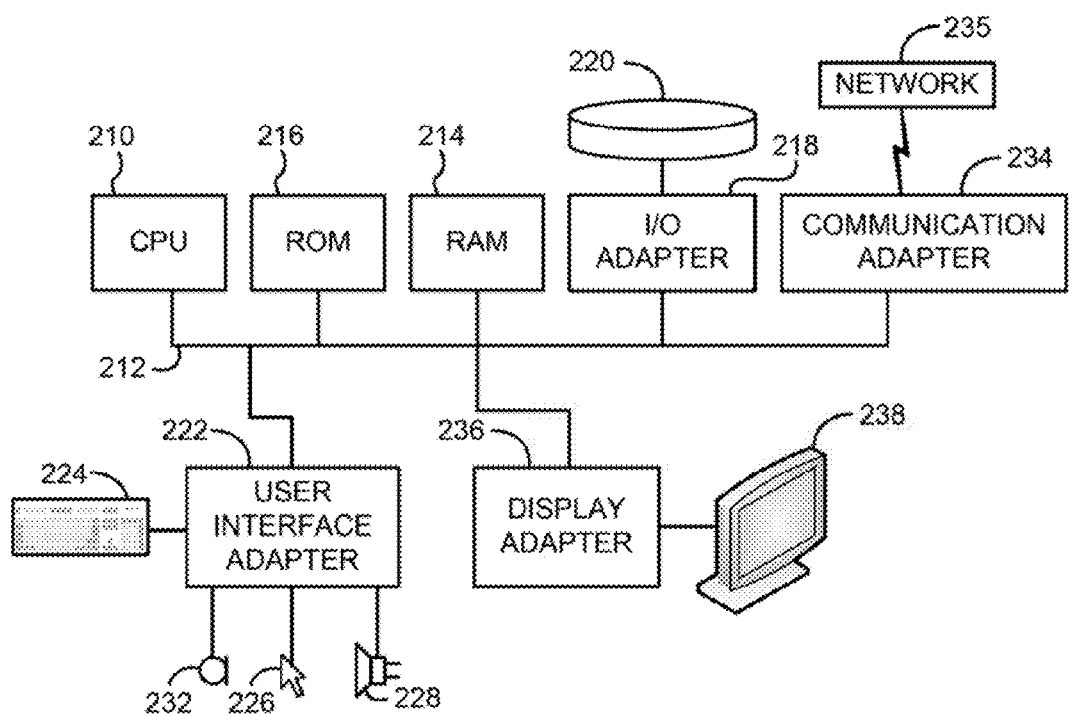
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212 communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
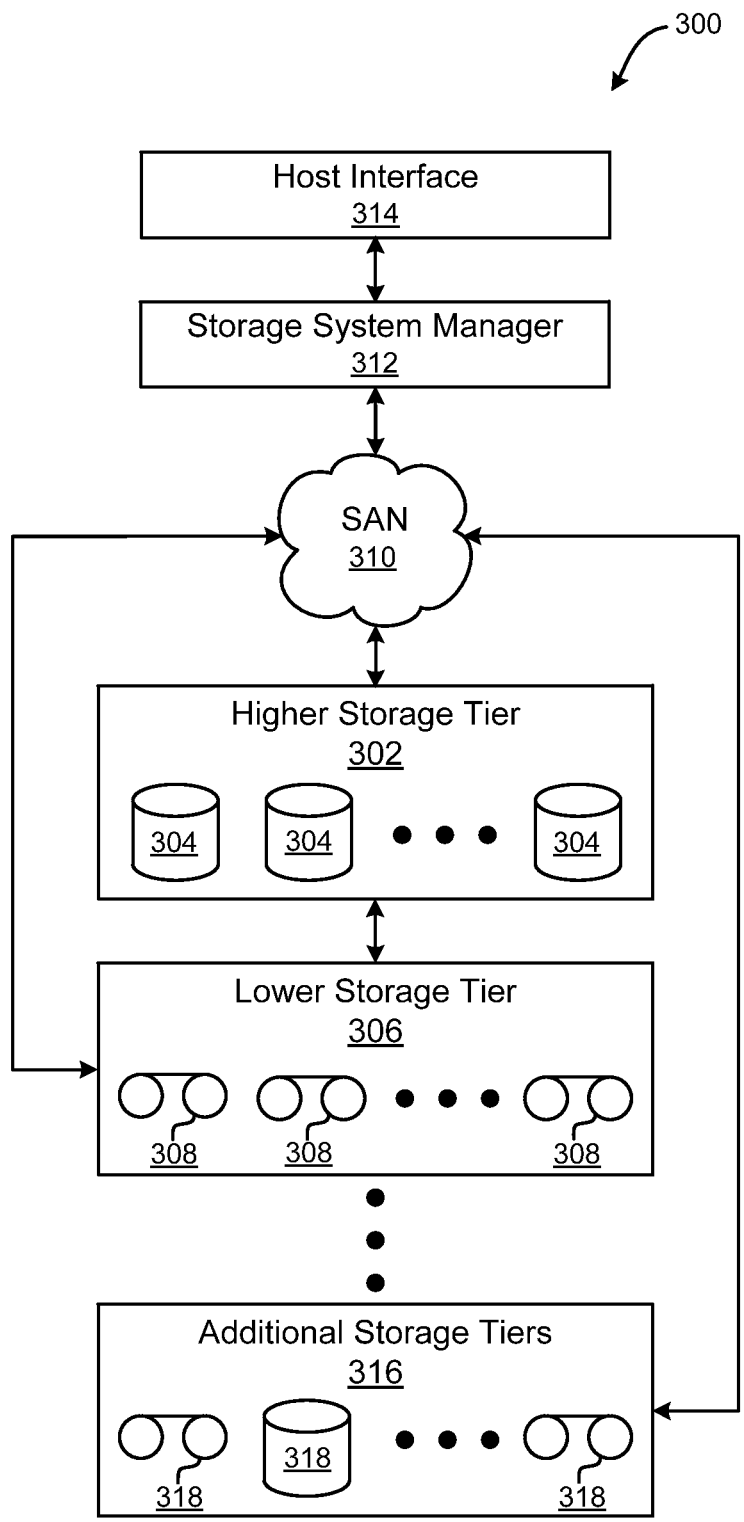
FIG. 3 is a simplified diagram of a storage system, according to one embodiment.

Now referring to FIG. 3, a storage system 300 is shown according to one embodiment. Of course, other types or arrangements of storage systems may be used in conjunction with the embodiments and approaches described herein in addition to or in place of the storage system 300 described in FIG. 3. Furthermore, the communication protocols used to communicate with the storage system 300 may be the same or different from those used in Ethernet networks.

Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media 318. The storage system manager 312 may communicate with the storage media 304, 308 on the higher and lower storage tiers 302, 306 through a network 310, such as a storage area network (SAN), as shown in FIG. 3.

The storage system manager 312 may also communicate with one or more host systems (not shown) through a host interface 314, which may or may not be a part of the storage system manager 312. These communications may take place via Fiber Channel over Ethernet (FCoE) and/or remote direct access memory (RDMA) over Converged Enhanced Ethernet (RoCEE).

The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc, for storing data in a lower performing storage environment, in this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic, adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

Figure 4:
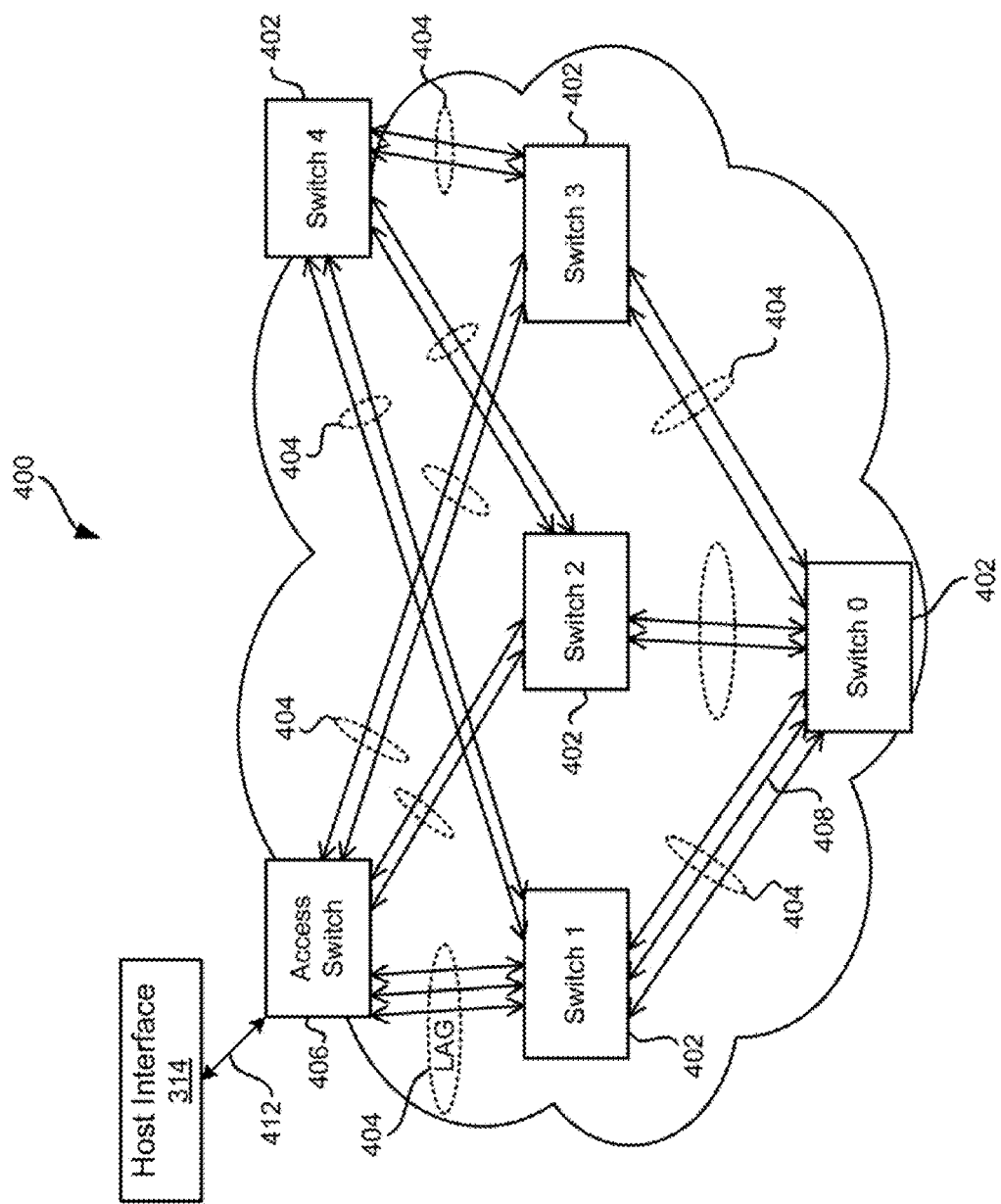
FIG. 4 is a simplified diagram of a system which has a plurality of switches connected together via connections using multiple link aggregations (LAGs), according to one embodiment.

Now referring to FIG. 4, a system 400 which has a plurality of switches 402 connected together via connections 408 using multiple LAGs 404 is shown, according to one embodiment. Each LAG 404 may be configured to send and receive information on one or more ports from each member switch. For example, Switch 0 is connected to Switch 3 via a LAG which is configured to send and receive information on two ports on each switch. There is also an access switch 406 which may be capable of additional routing functionality, but may still be connected via the connections 408 to the other switches 402 via ports which are in LAGs 404. In this context, any two switches connected together via a LAG 404 may be referred to as peer switches.

In addition, the access switch 406 may be connected via a host interface 314 to any storage system, such as storage system 300 described in FIG. 3 according to one embodiment. Referring again to FIG. 4, this connection via the host interface 314 may utilize storage system protocols, such as FCoE and/or RoCEE, and may also have multiple ports on each end system grouped together in a LAG.

Various embodiments disclosed herein enable LAG for a converged network. In addition, in order to address the various requirements of both TCP/IP network protocols and converged Ethernet network protocols for FCoE and/or RoCEE, a LAG may be based on a specific VLAN. In one approach, a server Converged Network Adapter (CNA) may be provided to aid in the implementation of the embodiments disclosed herein.

For FCoE over LAG which may be used for storage networking, a server side storage protocol stack does not use an Ethernet LAG distribution policy typically. The higher layer storage networking protocol at the end host monitors the physical link status and provides failover and/or load distribution from the storage networking stack itself. At the other end of the LAG, the access switch treats all individual physical ports as an independent layer 2 interface rather than a part of a LAG, as far as FCoE milk is concerned. This manifests into two constraints:

1) If an end host sends a storage request out of a physical port on a LAG enabled system, a response is returned via the same port on the LAG enabled system.
2) Certain broadcast (BCAST) or multicast (MCAST) packets for FCoE VLAN discovery and FCF (Fiber Channel Forwarder) discovery are received by all ports within the LAG enabled system.

Following from the above two constrains, the functionality of LAG as defined in 802.1AX is not required for FCoE traffic on server facing ports of an access switch. However, this does not effect the other ports on the access switch which are not server facing.

For RoCEE over LAG, one requirement is that bi-directional TCP flow is pinned to a physical port for the purpose of offload. This is similar to the constraints of FCoE previously described.

For converged network with LAG support, to provide for the above described requirements from the perspective of a switch, implemented in software, hardware or both, one embodiment provides the ability to define LAG parameters based on a specific VLAN. FCoE/RoCEE traffic is provided on a separate VLAN, and server facing ports on the access switch are treated as individual ports for the FCoE/RoCEE VLAN, but the same ports are treated as part of a LNG for a TCP/IP VLAN. This approach enables LAG for converged network, according to one embodiment.

Figure 5:
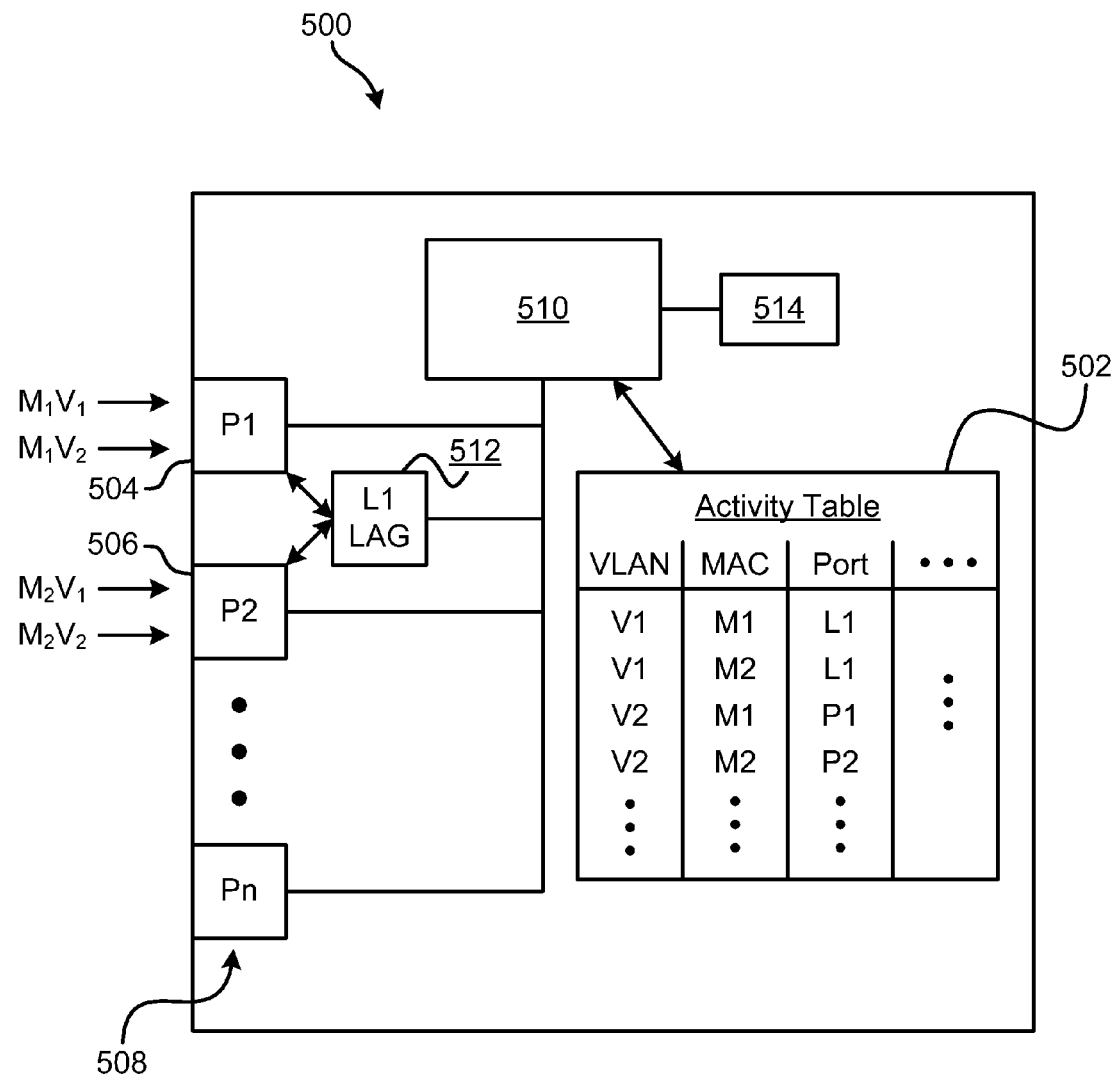
FIG. 5 is a simplified diagram of a switching device, according to one embodiment.

Referring now to FIG. 5, according to various embodiments, a switching device 500 comprises a processor 510, such as a circuit, an ASIC, a FPGA, etc., the processor 510 being configured for executing computer readable program code embodied as, e.g., software, firmware, vaporware, etc., and a plurality of ports 508. The processor 510 is also configured to provide the following capabilities: 1) an ability to learn MAC addresses on individual physical ports 508 for a specific VLAN; and 2) an ability to replicate BCAST/MCAST on all ports 508 of a LAG on a specific VLAN.

Architecture-wise, for every individual physical port 508, there is a MAC layer associated therewith, and there is a MAC line protocol that is running on top of the MAC layer. Most systems using layer 2 protocols are designed to request a service from the MAC line when a service is requested.

When a LAG is created, such as LAG L1 512, as layer is placed in-between the port and the MAC client. For example, the LAG provides a MAC line, and then when a layer 2 request for a service is received, for example sending a frame, the LAG module handles the frame, and there is a distribution algorithm in the LAG module which decides where to send the packet, regardless of whether it was received on a first port or a second port.

As noted above, however, it is desirable to allow the storage protocols to access the individual ports, rather than being handled by a LAG module.

In one approach, with reference to FIG. 5, a switch 500 may comprise any number of ports, e.g., P1, P2, ..., Pn 508, one or more LAGs for those ports, such as LAG L1 512, one or more processors 510, and logic 514 integrated with and/or executable by the one or more processors 510. In this exemplary embodiment, the switch 500 comprises two ports, P1 504 and P2 506. Also, the switch 500 maintains an activity table 502 which has fields, for example. VLAN, MAC, and output port. However, any suitable fields may be maintained in the activity table 502, as would be understood by one of skill in the art. In this exemplary embodiment, there are also two VLANs: V1, which is configured for TCP/IP, and V2, which is configured for FCoE, Of course, there may be more VLANs than those described in this exemplary embodiment, and each VLAN may be configured for use in different protocols than those described herein, as known by one of skill in the art. The switch 500 also includes a LAG, L1 512; however, any number of LAGs may be included to effectively use the ports present on the switch 500.

When a packet for V1 with MAC address M1 is received, information is added to the table 502. As shown in the first line of the table 502, the packet is from VLAN V1, MAC address M1, and was received on port L1 (which is a LAG designation). Similarly, if a packet on VLAN V1 and MAC address M2 comes in on port P2, an entry for this packet is added to the table 502 as coming in on port L1 (which is the LAG designation). The port is reported and recorded in the table 502 as LAG L1 512 because VLAN V1 is used for TCP/IP, so it is useful to maintain the LAG identifier to send and receive traffic for VLAN V1 in the table 502.

For packets on VLAN V2, however, the table 502 entries reflect the actual port being used. See lines 3 and 4 of the activity table 502. This is because VLAN V2 is used for FCoE, so it is not useful to maintain the LAG identifier to send and receive traffic for VLAN V2 in the table 502, only the actual port being used. A simple algorithm for programming an activity table, according to one embodiment, is as follows, where V=VLAN, P=PORT, and M=MAC Address, with V1 being used for TCP/IP traffic, and P2 being used for FCoE traffic:

If P = P1 or P2, check V,
    If V = V2, write table entry as M, V, P,
Else

Write table entry as M, V, L.

Thus, the activity table 502 is capable of keeping a record of the proper port or LAG for the various packets received, and when a return packet is received by the switch 500, the table 502 is consulted to direct the return packet back to LAG in the case of VLAN V1 and the appropriate port P1 504 or P2 506 for replies on PLAN P2. For example, if a return packet comes in marked as V1, M2, it is sent to the LAG 512. The LAG 512 may use a distribution algorithm to select which port to send the return packet to, according to one embodiment. If a return packet comes in marked as V2, M1, the return packet is sent to P1 504. Thus, the switch 500 allows packets on VLAN V2 to bypass the LAG 512 entirely.

Generally, when I/O is processed, particularly I/O regarding FC or FCoE for storage, such as for backing-up a file or system, a server utilizes peripheral component interconnect express (PCIe) to access a storage controller on a storage area network (SAN) which has direct access storage devices (DASDs), such as HDDs, SSDs, etc., connected thereto. When any file is saved, PCIe is used into the storage controller and ultimately into the DASD, or if the storage is external, then PCIe is used out into the network to access the storage. In the network, there is a mechanism called a Converged Network Adapter (CNA) that is configured to send Ethernet, as well as storage traffic. Accordingly, storage traffic proceeds over Ethernet, although there are multiple other modes. For simplicity it is assumed that Ethernet is used when storage traffic is received, it is converted into Ethernet, and is transmitted out onto the CNA.

Figure 6:
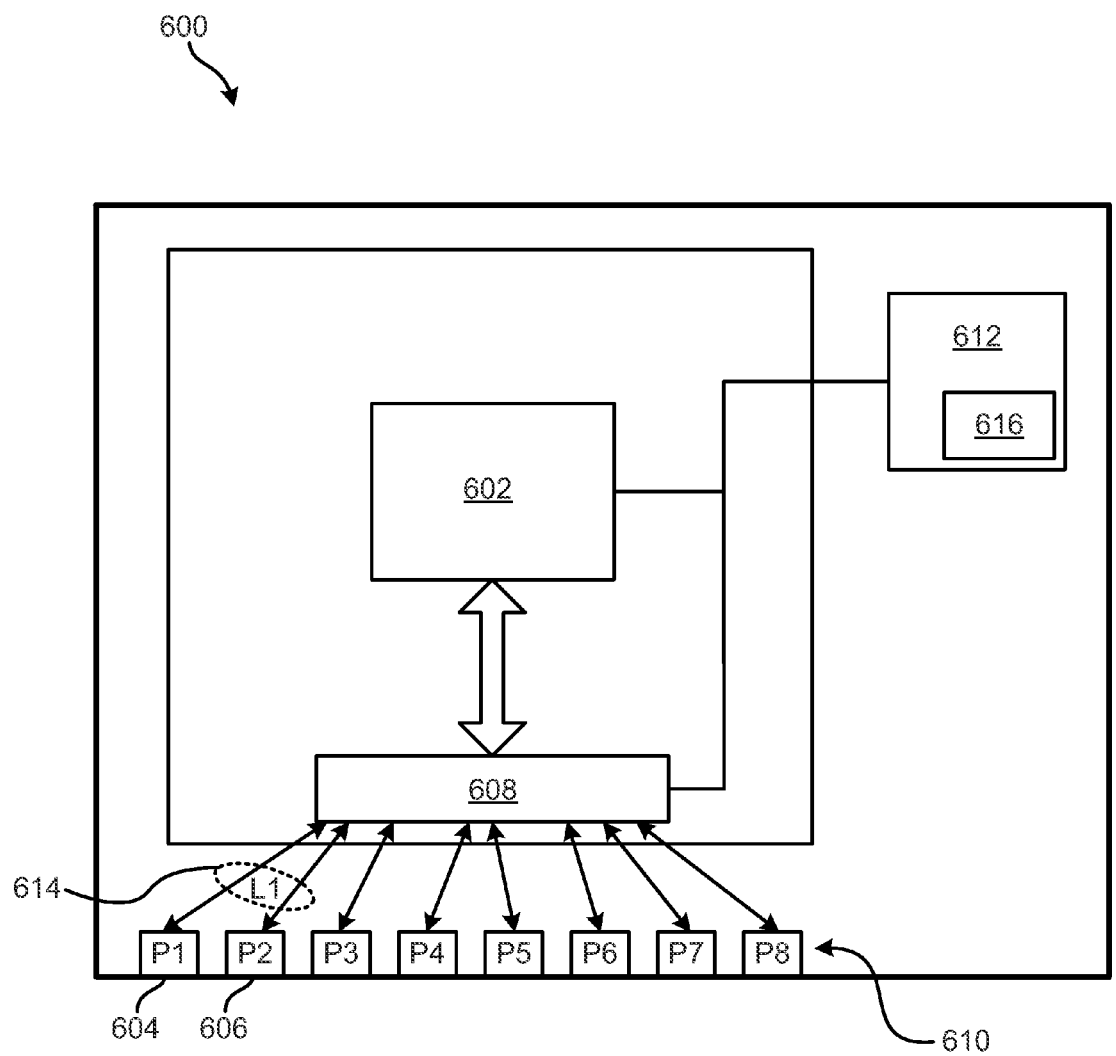
FIG. 6 is a simplified diagram of a server, according to one embodiment.

Now referring to FIG. 6, a server 600 is shown according to one embodiment. The server 600 may comprise a CNA 602, and the CNA 602 may have access to any number of ports 610, such as port 1 (P1) 604 and port 2 (P2) 606, as shown. For each of these ports, a processor 612 of the server 600 is capable of accessing logic 616 configured for performing at least two functions. One of the functions is FC communications, and another function is Ethernet communications. The server 600 also comprises an Ethernet driver 608 and a PCIe interface 608. For each LAG 614, the Ethernet driver 608 may tie up P1 604 and P2 606 and/or any other applicable ports 610 and create a single interface. Thus, if P1 604 and P2 606 are each a 10 Gb port, an operating system sees the LAG interface 614 as a 20 Gb interface. Moreover, if a TCP interface request is sent out over P1 604, and the reply is Returned to P2 606, the LAG 614 configuration accepts the reply.

For other types of standards-compliant communications, such as FC, RDMA, FCoE, RoCEE, etc., LAG may not be usable, in one example, assume a file system wants to access storage in a storage system, so it sends a request to P1 604. If the request is sent from P1 604, the file system will expect a response thereon; however, through use of LAG, the response may be returned on P2 606. Such a problem would have prohibited use of LAG on a CNA 602 in conventional systems. In fact, according to the prior art, the server 600 would have had to have separate network adapters for FC, RDMA, etc.

To solve the aforementioned problem, one embodiment defines a first VLAN interface (V1) that is used exclusively for TCP/IP regular traffic, a second VLAN interface (V2) that is used exclusively for FCOE, and a third VLAN interface (V3) that is used exclusively for RDMA. The two ports, P1 604 and P2 606 (or any number of ports) are defined as a LAG 614 for VLAN V1, but are individual ports for VLAN V2 and VLAN V3. Accordingly, VLAN V1 will see P1 604 and P2 606 as a LAG L1 614, but VLAN V2 and VLAN V3 will see each as an individual port.

Any known method of denoting packets as being from a particular VLAN, such as adding information to a header of the packet denoting the VLAN, assigning a corresponding overlay to the packet, or any other method may be used. In another approach, a tag in the packet or an indicator that the switch is capable of recognizing may denote the VLAN.

One skilled in the art, upon reading the present disclosure, will appreciate that the concepts presented herein may be extended to additional VLANs. Moreover, One skilled in the art, upon reading the present disclosure, will appreciate that the concepts presented herein may be used in any device, including servers, switches, uplinks, etc.

Turning now to broadcast packet processing, the typical rule for a broadcast packet is it is sent out to all ports within the VLAN. Assume that a broadcast packet comes in on P1 604, so the DMAC of the packet is BCAST and the packet is on VLAN V1. Assume also that there are several ports 610. When the broadcast packet comes in, a copy is sent to any other LAGs, as well as any individual ports 610 not associated with a LAG. In the case of a LAG, the packet is sent on one of the ports 610 associated with the LAG. The single copy may or may not be sent back out on the incoming LAG, in alternate approaches. A simple algorithm for processing a broadcast packet is as follows.

```
If (DMAC = BCAST and V = V2),
    DPORT_bitmap = P1 +P2 + all other ports,
Else, if V = V1,
    DPORT_bitmap = (P1 or P2) + all other ports.
```

In an alternate approach, the LAG may be bypassed, and the packet may be sent out on all ports 610, except possibly the port on which the packet was received and any port in a LAG shared by the port on which the packet was received.

For multicast packet processing, a multicast address may specify certain ports 610 to use to send copies of the packet. For example, a Multicast group N may be contained on the port P1 604, P2 606 and another port, such as P4. In that case, if a Multicast packet comes in on P1 604, it is sent out on P2 606 and P4, but not on P3.

Figure 7:
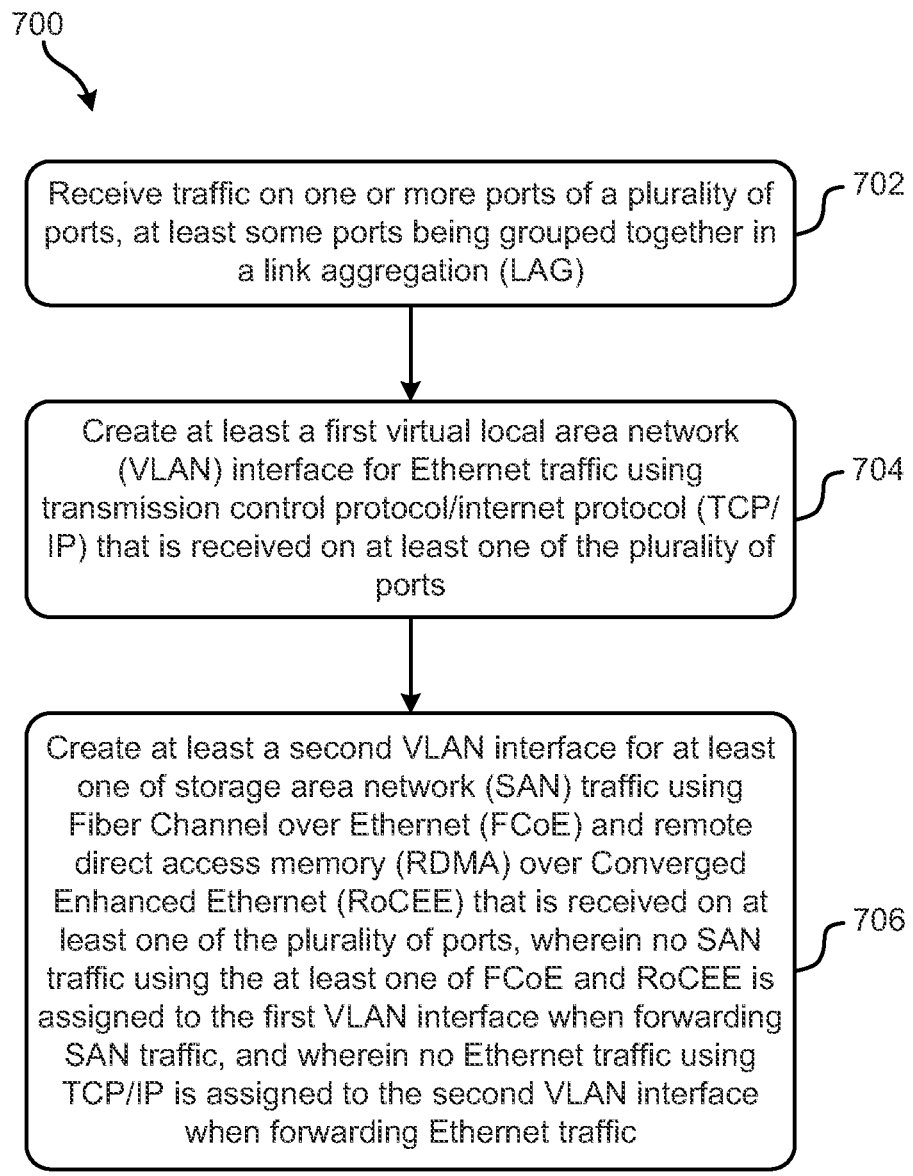
FIG. 7 is a flowchart of a method, according to one embodiment.

Now referring to FIG. 7, a method 700 for providing LAG to a converged network is shown according to one embodiment. The method 700 may be carried out in any desired environment, including those described herein and others as would be known in the art. Also, more or less operations than those described in FIG. 7 may be included in method 700 according to various embodiments. Of course, one of skill in the art may envision different embodiments and/or approaches than those described herein, and these may be included in the method 700 as well.

In operation 702, network traffic is received on one or more ports of a plurality of ports, at least some ports being grouped together in a LAG. Which ports are grouped in the LAG, the number of LAGs, the number of ports, etc., may all be determined based on needs of the actual network, switch, server, and/or system in which the method 700 is implemented, according to various embodiments. The network traffic may comprise any number of packets, each packet adhering to one or more transmission protocol standards, such as TCP/IP, FCoE, and/or RoCEE.

In operation 704, at least a first VLAN interface is created for Ethernet traffic using TCP/IP that is received on at least one of the plurality of ports. Any other Ethernet transmission protocol may also be designated to the first VLAN as long as it does not require that return packets be sent using the identical port on which a source packet was received. Any of the ports on which the Ethernet traffic using TCP/IP is received may be in a LAG, and the LAG may be shared by other ports as well. Furthermore, more than one first VLAN may be created, as long as only Ethernet traffic using TCP/IP (or other acceptable transmission protocols) is assigned to the first VLAN.

In operation 706, at least a second VLAN interface is created for SAN traffic using FCoE, RoCEE, and or an other acceptable SAN transmission protocol known in the art that is received on at least one of the plurality of ports. This traffic may be received on the same port as the Ethernet traffic, but in most cases, will be received on a different port or ports than the port or ports on which Ethernet traffic using TCP/IP is received.

In method 700, no SAN traffic using FCoE and/or RoCEE is assigned to the first VLAN, interface when forwarding SAN traffic, and no Ethernet traffic using TCP/IP is assigned to the second VLAN interface when forwarding Ethernet traffic.

In one embodiment, an activity table may be maintained, the activity table including information for each received packet. In one approach, the information may comprise at least: a VLAN associated with the packet, a MAC address for the packet (source SMAC and/or destination DMAC), and an output port or LAG designation. When the packet is received on a port in a LAG, then the LAG designation is stored to the activity table instead of the physical port. That way, when packets are sent back out, they can be sent on any port in the LAG according to a distribution algorithm for the LAG. The method 700 may also include choosing an appropriate output port or LAG from the activity table when sending a packet. In this way, the proper output port or LAG of ports is able to be chosen for output traffic.

In a further description, an individual port may be chosen when a packet is sent using FCoE and/or RoCEE or other acceptable SAN transmission protocols), and either an individual port or a LAG may be chosen when a packet is sent using TCP/IP (or other acceptable Ethernet transmission protocols).

According to another embodiment, the method 700 may include learning a MAC address associated with a received packet on all ports on which SAN traffic using FCoE and/or RoCEE (or other acceptable SAN transmission protocols) is received, and replicating broadcast and/or multicast packets to all ports on which SAN traffic using ECoE and/or RoCEE is received (or other acceptable SAN transmission protocols). In this way, BCAST and/or MCAST packets for FCoE VLAN discovery and FCF discovery packets are received by all ports within the LAG enabled converged network.

According to some approaches, the plurality of ports may be server-facing ports, and/or a CNA may be connected to the plurality of ports, with the one or more LAGs being visible to the CNA.

Method 700 may be implemented in any system, device, apparatus, and/or computer program product. For example, method 700 may be implemented in an access switch, a switch, a router, a server, or any other networking device.

In one such embodiment, a system may comprise a switching processor configured to execute logic, a plurality of ports, at least some of the ports being grouped together in one or more LAGs, logic adapted to create at least a first VLAN interface for Ethernet traffic using TCP/IP that is received on at least one of the plurality of ports, and logic adapted to create at least a second VLAN for SAN traffic using FCoE and/or RoCEE that is received on at least one of the plurality of ports, wherein no SAN traffic using FCoE and/or RoCEE is assigned to the first VLAN, and wherein no Ethernet traffic using TCP/IP is assigned to the second VLAN.

In another embodiment, computer program product for providing LAG to a converged network, the computer program product comprising a computer readable storage medium having program code embodied therewith, the program code readable/executable by a computer to: receive network traffic on one or more ports of a plurality of ports, at least some ports being grouped together in a LAG; create at least a first VLAN interface for Ethernet traffic using TCP/IP that is received on at least one of the plurality of ports; and create at least a second VLAN for SAN traffic using FCoE and/or RoCEE that is received on at least one of the plurality of ports, wherein no SAN traffic using FCoE and/or RoCEE is assigned to the first VLAN, and wherein no Ethernet traffic using TCP/IP is assigned to the second VLAN.

Of course, any of the other embodiments and/or approaches described in regard to method 700 may be implemented in any of the systems, devices, and/or computer program products in various other embodiments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a switching processor configured to execute logic;
   a plurality of ports, at least some of the ports being grouped together in one or more link aggregations (LAGs);
   logic configured to create at least a first virtual local area network (VLAN) interface for Ethernet traffic using transmission control protocol/internet protocol (TCP/IP) that is received on at least one of the plurality of ports, the first VLAN interface being used exclusively for traffic designated in a first VLAN;
   logic configured to create at least a second VLAN interface for at least one of storage area network (SAN) traffic using Fiber Channel over Ethernet (FCoE) and remote direct access memory (RDMA) over Converged Enhanced Ethernet (RoCEE) that is received on at least one of the plurality of ports, the second VLAN interface being used exclusively for traffic designated in a second VLAN; and
   logic configured to maintain an activity table, the activity table comprising information for each received packet, the information comprising at least: a VLAN for each received packet, at least one of a source media access control (MAC) address and a destination MAC address associated with each received packet, and one of an output port and an output LAG associated with each received packet,
   wherein an output port is stored when the received packet was received on an individual port not associated with any LAG,
   wherein an output port is stored when the received packet was received on a port associated with a LAG and the received packet is designated as SAN traffic, and
   wherein an output LAG is designated when the received packet was received on a port associated with a LAG and the received packet is designated as Ethernet traffic; and
   logic configured to choose an appropriate one of an output port and an output LAG from the activity table when sending a packet,
   wherein no SAN traffic using the at least one of FCoE and RoCEE is assigned to the first VLAN interface when forwarding SAN traffic, and
   wherein no Ethernet traffic using TCP/IP is assigned to the second VLAN interface when forwarding Ethernet traffic.

2. The system as recited in claim 1, wherein an individual port is chosen from the activity table when a packet is sent using the at least one of FCoE and RoCEE, wherein an individual port not associated with a LAG is chosen from the activity table when a packet is sent using TCP/IP and the received packet was received on an individual port, and wherein a LAG is chosen from the activity table when a packet is sent using TCP/IP and the received packet was received on a LAG.

3. The system as recited in claim 1, further comprising a converged network adapter (CNA) connected to the plurality of ports, wherein the one or more LAGs are visible to the CNA.

4. The system as recited in claim 1, further comprising:
   logic configured to learn a media access control (MAC) address associated with a received packet on all ports on which SAN traffic using the at least one of FCoE and RoCEE is received; and
   logic configured to replicate broadcast and multicast packets to all ports on which SAN traffic using the at least one of FCoE and RoCEE is received.

5. The system as recited in claim 1, wherein the plurality of ports are server-facing ports.

6. A method for providing link aggregation (LAG) to a converged network, the method comprising:
   receiving traffic on one or more ports of a plurality of ports, at least some ports being grouped together in a link aggregation (LAG);
   creating at least first virtual local area network (VLAN) interface for Ethernet traffic using transmission control protocol/internet protocol (TCP/IP) that is received on at least one of the plurality of ports, the first VLAN interface being used exclusively for traffic designated in a first VLAN;
   creating at least a second VLAN interface for at least one of storage area network (SAN) traffic using Fiber Channel over Ethernet (FCoE) and remote direct access memory (RDMA) over Converged Enhanced Ethernet (RoCEE) that is received on at least one of the plurality of ports, the second VLAN interface being used exclusively for traffic designated in a second VLAN; and
   maintaining an activity table, the activity table comprising information for each received packet, the information comprising at least: a VLAN for each received packet, at least one of a source media access control (MAC) address and a destination MAC address associated with each received packet, and one of an output port and an output LAG,
   wherein an output port is stored when the received packet was received on an individual port not associated with any LAG,
   wherein an output port is stored when the received packet was received on a port associated with a LAG and the received packet is designated as SAN traffic, and
   wherein an output LAG is designated when the received packet was received on a port associated with a LAG and the received packet is designated as Ethernet traffic,
   wherein no SAN traffic using the at least one of FCoE and RoCEE is assigned to the first VLAN interlace when forwarding SAN traffic, and
   wherein no Ethernet traffic using TCP/IP is assigned to the second VLAN interface when forwarding Ethernet traffic.

7. The method as recited in claim 6, further comprising:
   choosing an appropriate one of an output port and an output LAG from the activity table when sending a packet.

8. The method as recited in claim 6, wherein an individual port is chosen from the activity table when a packet is sent using the at least one of FCoE and RoCEE, and wherein an individual port not associated with a LAG is chosen from the activity table when a packet is sent using TCP/IP and the received packet was received on an individual port, and wherein a LAG is chosen from the activity table when a packet is sent using TCP/IP and the received packet was received on a LAG.

9. The method as recited in claim 6, further comprising:
learning a media access control (MAC) address associated with a received packet on all ports on which SAN traffic using the at least one of FCoE and RoCEE is received; and
replicating at least one of broadcast and multicast packets to all ports on which SAN traffic using the at least one of FCoE and RoCEE is received.

10. The method as recited in claim 6, wherein the plurality of ports are server-facing ports.

11. A computer program product for providing link aggregation (LAG) to a converged network, the computer program product comprising a non-transitory computer readable storage medium having program code embodied therewith, the program code readable/executable by a computer to:
receive network traffic on one or more ports of a plurality of ports, at least some ports being grouped together in a link aggregation (LAG);
create at least a first virtual local area network (VLAN) interface for Ethernet traffic using transmission control protocol/internet protocol (TCP/IP) that is received on at least one of the plurality of ports, the first VLAN interface being used exclusively for traffic designated in a first VLAN;
create at least a second VLAN interface for at least one of storage area network (SAN) traffic using Fiber Channel over Ethernet (FCoE) and remote direct access memory (RDMA) over Converged Enhanced Ethernet (RoCEE) that is received on at least one of the plurality of ports, the second VLAN interface being used exclusively for traffic designated in a second VLAN;
maintain an activity table, the activity table comprising information for each received packet, the information comprising at least: a VLAN, a media access control (MAC) address, and at least one of an output port and a LAG designation; and
choose an appropriate one of an output port and a LAG from the activity table when sending a packet,
wherein no SAN traffic and only Ethernet traffic is forwarded using an output LAG via the first VLAN interface,
wherein no SAN traffic using the at least one of FCoE and RoCEE is assigned to the first VLAN interface when forwarding SAN traffic, and
wherein no Ethernet traffic using TCP/IP is assigned to the second VLAN interface when forwarding Ethernet traffic.

12. The computer program product as recited in claim 11, wherein an individual port is chosen from the activity table when a packet is sent using the at least one of FCoE and RoCEE, and wherein an individual port not associated with a LAG is chosen from the activity table when a packet is sent using TCP/IP and the received packet was received on an individual port, and wherein a LAG is chosen from the activity table when a packet is sent using TCP/IP and the received packet was received on a LAG.

13. The computer program product as recited in claim 11, wherein the program code further causes the computer to:
learn a media access control (MAC) address associated with a received packet on all ports on which SAN traffic using the at least one of FCoE and RoCEE is received; and
replicate broadcast and/or multicast packets to all ports on which SAN traffic using the at least one of FCoE and RoCEE is received.

14. The computer program product as recited in claim 11, wherein the plurality of ports are server-facing ports.

* * * * *